March 25, 1941.　　　　B. L. BURNS　　　　2,236,464
ROLL ADJUSTING MECHANISM
Filed June 8, 1938　　　3 Sheets-Sheet 1

INVENTOR
BERNARD L. BURNS
BY Albert G. Blodgett
ATTORNEY

March 25, 1941.   B. L. BURNS   2,236,464
ROLL ADJUSTING MECHANISM
Filed June 8, 1938   3 Sheets-Sheet 2

INVENTOR
BERNARD L. BURNS
BY
ATTORNEY

March 25, 1941.    B. L. BURNS    2,236,464
ROLL ADJUSTING MECHANISM
Filed June 8, 1938    3 Sheets-Sheet 3

INVENTOR
BERNARD L. BURNS
BY Albert G. Blodgett
ATTORNEY

Patented Mar. 25, 1941

2,236,464

UNITED STATES PATENT OFFICE 2,236,464

ROLL ADJUSTING MECHANISM

Bernard L. Burns, Worcester, Mass., assignor to Morgan Construction Company, Worcester, Mass., a corporation of Massachusetts Application June 8, 1938, Serial No. 212,538

5 Claims. (Cl. 80—56)

This invention relates to roll adjusting mechanisms, and more particularly to a power actuated mechanism for adjusting the bearings of a rolling mill roll in directions transversely of the roll axis.

Rolling mill rolls are ordinarily supported by means of a pair of axially spaced bearings. By adjusting both of the bearings simultaneously the roll can be moved transversely to vary its distance from a cooperating roll, and by adjusting one of the bearings alone the roll can be brought into parallelism with the said cooperating roll. Adjustment of the bearings when the mill is in operation involves the application of large forces and is preferably accomplished at low speed, whereas when the mill rolls are not under load the forces required to adjust the bearings are comparatively small and the adjustment may be effected at high speed. This high speed actuation of the bearing adjusting devices is often advantageous in reducing the time required to change the rolls. Various mechanisms have been proposed heretofore for adjusting the bearings selectively or simultaneously, and at high or low speeds, but in general these prior mechanisms have been complicated, bulky and expensive.

It is accordingly one object of the invention to provide a comparatively simple, compact and inexpensive mechanism for adjusting the bearings of a rolling mill roll either rapidly or slowly, as may be desired, and to so arrange the various parts that independent adjustment of the bearings may be readily effected for the purpose of aligning the roll properly with a cooperating roll.

It is a further object of the invention to provide a roll adjusting mechanism utilizing a single electric motor of the constant speed type and so constructed and arranged that both bearings of the roll can be adjusted simultaneously or individually, and at a high or low speed as desired.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a vertical section through a rolling mill, taken on the line 1—1 of Fig. 3;

Figure 1:
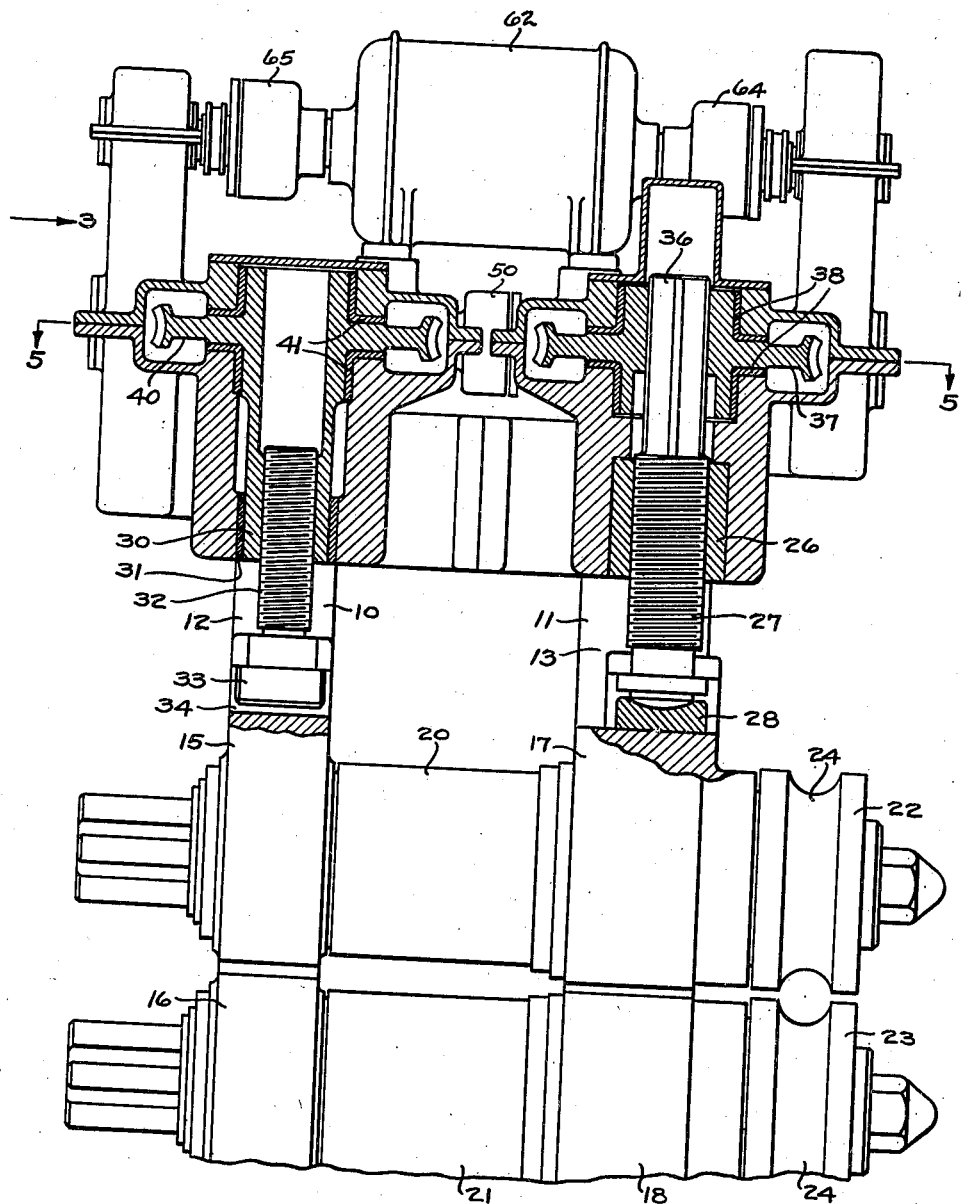

The embodiment illustrated comprises a pair of upright housings 10 and 11 having the usual windows 12 and 13 respectively. In the window 12 there is mounted an upper bearing 15 and a lower bearing 16 (Fig. 1), and in the window 13 there is mounted an upper bearing 17 and a lower bearing 18. An upper roll shaft 20 is rotatably supported in the upper bearings 15 and 17, and a lower roll shaft 21 is rotatably supported in the lower bearings 16 and 18. On one end of the upper shaft 20 and adjacent the bearing 17 there is mounted an upper roll 22, while on the corresponding end of the lower shaft 21 and adjacent the bearing 18 there is mounted a lower roll 23. Each of the rolls 22 and 23 is provided with a suitably shaped circumferential groove 24, these grooves in the two rolls cooperating to provide a formed pass for the stock. The rolls illustrated are of the overhung type.

In order that the spacing of the rolls may be controlled and their axes maintained in parallelism, the upper bearings 15 and 17 are arranged to slide vertically in their respective windows, and means is provided to adjust the bearings upwardly or downwardly as may be desired. For this purpose the housing 11 is provided above the window 13 with a stationary nut 26 through which there extends a vertical rotatable screw 27. The lower end of the screw 27 engages a breaker block 28 mounted on the top of the upper bearing 17. When the mill is in operation the pressure resulting from the rolling action will tend to raise the bearing 17 and hold the block 28 in contact with the screw thereby applying a compression load to the screw. In the housing 10 above the window 12 there is mounted a nut 30 which is surrounded by a suitable antifriction bushing 31, the nut being rotatable about a vertical axis. A vertical screw 32 extends through the nut 30, the lower end of this screw having an enlargement 33 thereon which fits within a T-shaped slot 34 in the top of the bearing 15. When the mill is in operation the pressure resulting from the rolling action will tend to lower the bearing 15, but this tendency will be resisted by tension in the screw 32. It will be seen that the screw 27 and the nut 30 form a pair of roll adjusting devices which are rotatable about parallel axes.

Means is provided to rotate the screw 27, and for this purpose the screw is formed with an upward extension 36 of approximately square or other non-circular cross section which projects through a similarly shaped opening in the center of a rotatable worm gear 37. The extension 36 is slidable through the gear. This worm gear 37 is rotatably mounted in the housing 11 and held against axial movement by means of suitable flanged antifriction bushings 38 which surround the hub of the gear. In order to rotate the nut 30, a worm gear 40 is provided above the nut and formed integral therewith or otherwise connected thereto. This gear 40 is rotatably mounted in the housing 10 and held against axial movement by means of suitable flanged antifriction bushings 41 which surround the hub of the gear. It will be noted that the gears 37 and 40 rotate in a common horizontal plane about parallel vertical axes.

Figure 5:
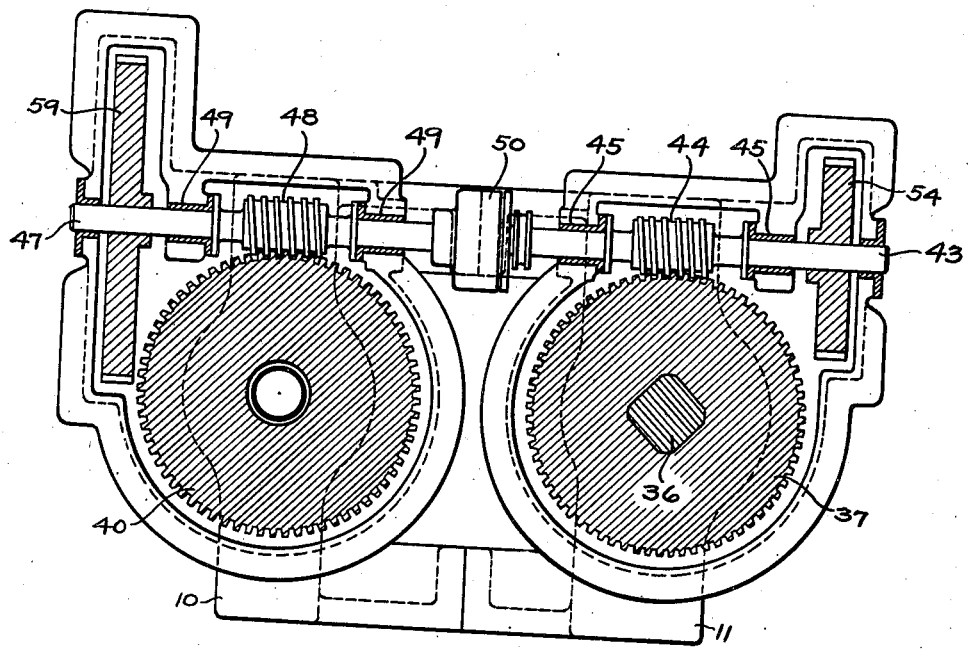
Fig. 5 is a section on the line 5—5 of Fig. 1.

The gears 37 and 40 may be driven either simultaneously or selectively. For this purpose there is provided a shaft 43 (Fig. 5) with a worm 44 thereon which meshes with the gear 37, this shaft being mounted in bearings 45, and there is also provided a shaft 47 with a worm 48 thereon which meshes with the gear 40, the shaft 47 being mounted in bearings 49. The two shafts 43 and 47 are arranged in axial alignment with each other and parallel with the roll shaft 20. The adjacent inner ends of the shafts 43 and 47 may be connected by means of a releasable coupling or clutch 50, which is preferably of the well-known magnetic type with a suitable remote control device.

Figure 2:
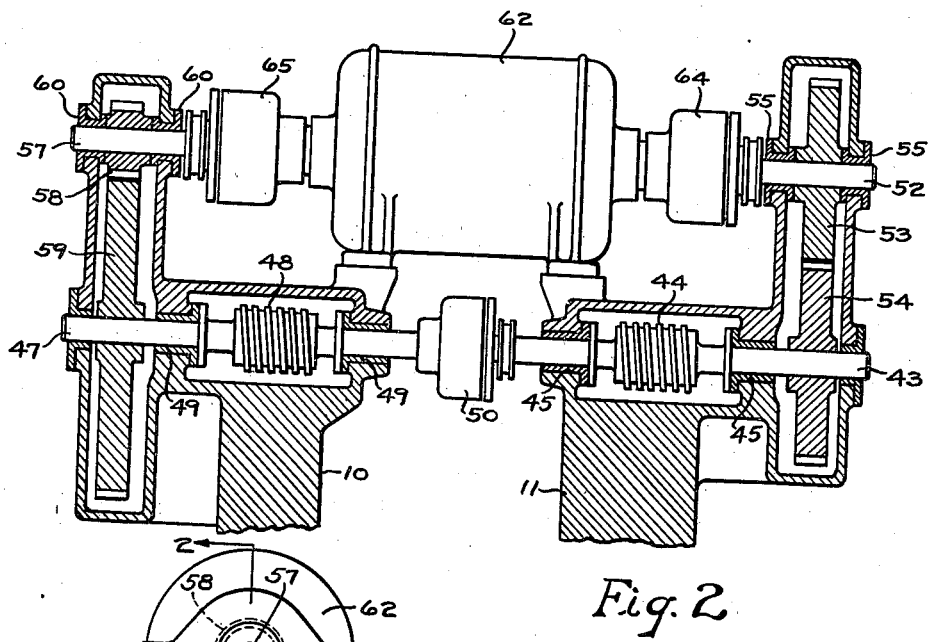
Fig. 2 is a section on the line 2—2 of Fig. 3.
Figure 3:
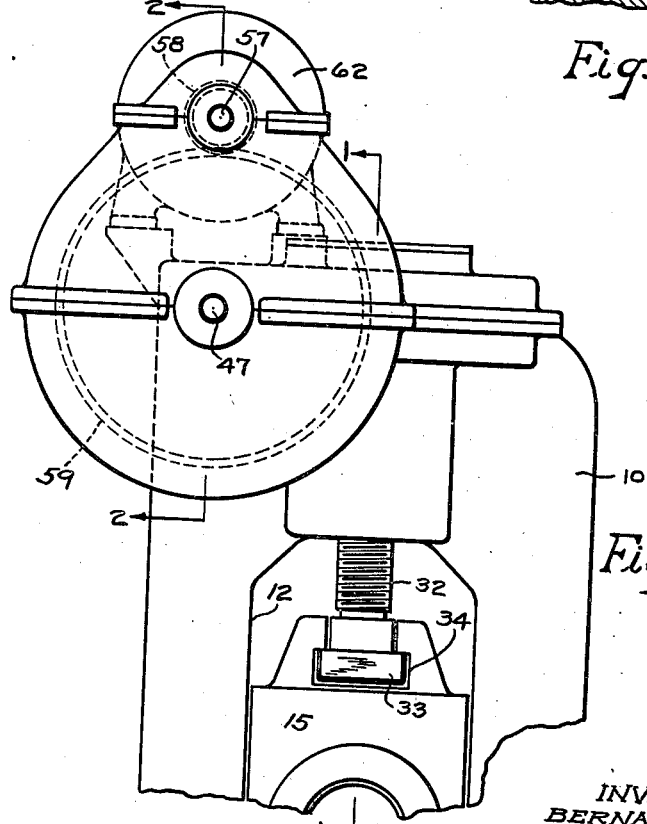
Fig. 3 is a side elevation of the mill, as indicated by the arrow 3 in Fig. 1.
Figure 4:
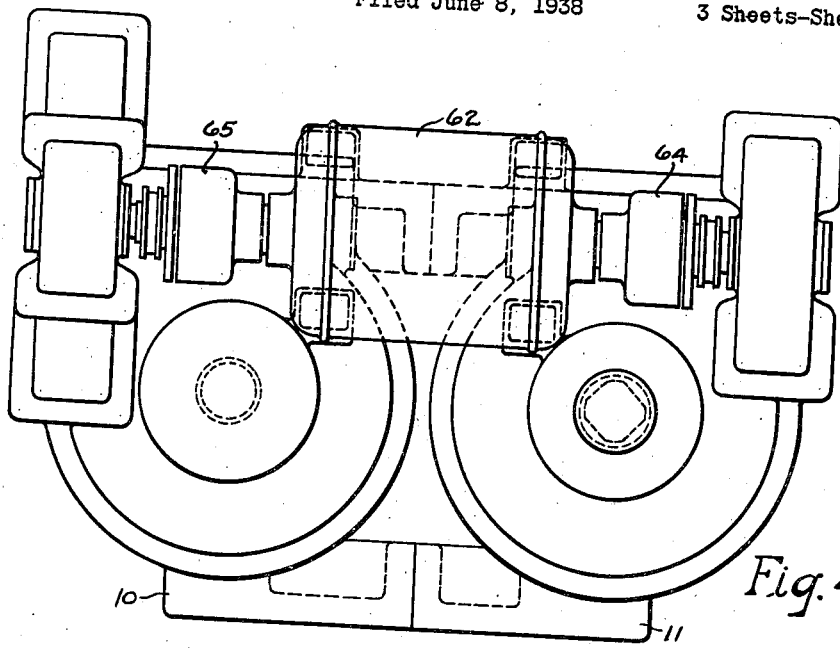
Fig. 4 is a top plan view of the mill.

Driving means is provided whereby the shaft 43 may be rotated at a comparatively high speed if desired, or the shaft 47 may be rotated at a comparatively low speed when occasion demands. In the preferred embodiment illustrated, a shaft 52 (Fig. 2) is mounted above and parallel to the shaft 43, the shaft 52 having a gear 53 thereon which meshes with a gear 54 on the shaft 43. The upper shaft 52 is rotatably supported in bearings 55. A shaft 57 is mounted above and parallel to the shaft 47, the shaft 57 having a pinion 58 thereon which meshes with a gear 59 on the shaft 47. The upper shaft 57 is rotatably supported in bearings 60. The pinion 58 is considerably smaller in diameter than the gear 59 which meshes therewith, whereas the gears 54 and 55 are shown substantially equal to each other in diameter. The two upper shafts 52 and 57 are axially aligned and spaced apart sufficiently to provide room for a reversible electric motor 62. This motor is provided with a shaft in alignment with the shafts 52 and 57 and extending from both ends of the motor. A releasable coupling or clutch 64 is provided between the shaft 52 and one end of the motor shaft, and a similar releasable coupling or clutch 65 is provided between the shaft 57 and the other end of the motor shaft. These clutches 64 and 65 may be of the well-known magnetic type with suitable remote control devices.

The operation of the invention will now be apparent from the above disclosure. When it is desired to raise or lower the roll 22 slowly in order to adjust the spacing of the rolls accurately, the clutches 65 and 50 will be engaged and the clutch 64 will be disengaged. Then the motor 62 will be operated in the proper direction, driving the worms 48 and 44 at a comparatively slow speed through the medium of the pinion 58 and the gear 59. The worms will drive the worm gears 40 and 37, rotating the nut 30 and the screw 27. The screws 32 and 27 will thus move axially, raising or lowering the bearings 15 and 17, with the roll shaft 20 and the roll 22. If a rapid adjustment of the roll is desired, the clutches 64 and 50 will be engaged and the clutch 65 disengaged. Then the motor will drive the worms 44 and 48 at a comparatively high speed through the medium of the gears 53 and 54, thus raising or lowering the roll bearings in the required manner. Adjustments of the roll 22 to bring its axis into parallelism with that of the lower roll 23 will ordinarily be effected at low speed. Such an adjustment can be brought about by engaging the clutch 65, disengaging the clutches 64 and 50, and operating the motor in the required direction. Thus the pinion 58 and the gear 59 will drive the worm 48, while the worm 44 remains stationary, and the bearing 15 will be raised or lowered as required without changing the height of the bearing 17.

It will be noted that the invention provides a construction which is much simpler and more compact than apparatus heretofore utilized for the same purpose. Only a single electric motor is required, and this may be of the comparatively inexpensive constant-speed type. While the invention has been shown in connection with a mill of the 2-high type having over hung rolls, it will be obvious that it is equally applicable to mills having rolls provided with bearings on opposite sides of the line of stock travel, and to mills of the 3-high and 4-high type.

Having thus described my invention, what I claim as new and desire to secure by Letters Patent is:

1. A rolling mill comprising a roll, two axially spaced bearings for the roll, a separate adjusting device for each bearing, a releasable coupling whereby the two adjusting devices may be connected to operate simultaneously, a motor, and selectively operable means whereby the motor can be connected to one of the devices to operate the same at a comparatively low speed or to the other of the devices eto operate the same at a comparatively high speed.

2. A rolling mill comprising a roll, two axially spaced bearings for the roll, a separate adjusting device for each bearing, a releasable coupling whereby the two adjusting devices may be connected to operate simultaneously, a motor, a comparatively low ratio driving connection between the motor and one adjusting device, a comparatively high ratio driving connection between the motor and the other adjusting device, and selectively operable means whereby one or the other of said driving connections can be rendered effective.

3. A rolling mill comprising a roll, two axially spaced bearings for the roll, two aligned rotatable shafts, means connecting the shafts to the bearings respectively to adjust the same, a releasable coupling whereby the adjacent ends of the shafts may be connected, a motor, a comparatively low ratio driving connection between the motor and one shaft, a comparatively high ratio driving connection between the motor and the other shaft, and a separate releasable coupling associated with each of said driving connections to control the transmission of power to the associated shaft.

4. A rolling mill comprising a roll, two axially spaced bearings for the roll, two worm gears rotatable in a common plane about parallel axes, means connecting the worm gears to the bearings respectively to adjust the same, two aligned rotatable shafts, a worm on each shaft, the worms meshing with the worm gears respectively, a releasable coupling whereby the adjacent ends of the worm shafts may be connected, a motor having a rotatable shaft extending from both ends thereof and parallel with said worm shafts, a comparatively low ratio driving connection between one end of the motor shaft and one of the worm shafts, a comparatively high ratio driving connection between the other end of the motor shaft and the other worm shaft, and a separate releasable coupling associated with each of said driving connections to control the transmission of power to the associated worm shaft.

5. A rolling mill comprising a roll, two axially spaced bearings for the roll, two worm gears rotatable in a common plane about parallel axes, means connecting the worm gears to the bearings respectively to adjust the same, two aligned rotatable shafts, a worm on each shaft, the worms meshing with the worm gears respectively, a releasable coupling whereby the adjacent ends of the worm shafts may be connected, a motor having a rotatable shaft extending from both ends thereof and parallel with said worm shafts, comparatively low ratio gearing to actuate one of the worm shafts, comparatively high ratio gearing to actuate the other worm shaft, a releasable coupling to connect one end of the motor shaft to the low ratio gearing, and a releasable coupling to connect the other end of the motor shaft to the high ratio gearing.

BERNARD L. BURNS.